(12) United States Patent
Sutardja

(10) Patent No.: US 6,507,449 B1
(45) Date of Patent: Jan. 14, 2003

(54) DIGITAL SERVO DEMODULATOR WITH SYNCHRONOUS DITHERING AND METHOD

(75) Inventor: Pantas Sutardja, San Jose, CA (US)

(73) Assignee: Marvell International, Ltd., Hamilton (BM)

(*) Notice: Subject to any disclaimer, the term of this patent is extended or adjusted under 35 U.S.C. 154(b) by 0 days.

(21) Appl. No.: 09/208,211

(22) Filed: Dec. 9, 1998

(51) Int. Cl.[7] .................................................. G11B 5/596
(52) U.S. Cl. ................................. 360/77.02; 360/77.17
(58) Field of Search ......................... 360/77.05, 46, 360/65, 77.17, 77.02, 29, 32, 39; 341/131, 118, 155, 120, 143; 364/574

(56) References Cited

U.S. PATENT DOCUMENTS

| | | | |
|---|---|---|---|
| 5,265,039 A | * 11/1993 | Curbelo et al. | 364/574 |
| 5,343,340 A | 8/1994 | Boutaghou et al. | 360/77.08 |
| 5,825,318 A | * 10/1998 | Patapoutian et al. | 341/131 |
| 5,966,258 A | * 10/1999 | Bliss | 360/67 X |

* cited by examiner

Primary Examiner—David Hudspeth
Assistant Examiner—K. Wong
(74) Attorney, Agent, or Firm—Eric B. Janofsky; Katten Muchin Zavis Roseman

(57) ABSTRACT

The effective resolution of a Position Error Signal (PES) in a disk drive servo is increased by synchronously dithering the analog PES while sampling it with an Analog-to-Digital Converter (ADC). For each cycle of a burst field signal on a servo sector, a DC offset is added to the analog PES before sampling. The offset is changed periodically during the sampling of the burst field signal. The set of all DC offsets used is evenly spread over a range which is substantially equal to the size of the least significant bit of the ADC multiplied by a positive integer.

29 Claims, 4 Drawing Sheets

DIGITAL SERVO DEMODULATOR WITH SYNCHRONOUS DITHERING AND METHOD

FIELD OF INVENTION

This invention pertains to the field of embedded sector servo technology and more specifically, to synchronous dithering of a disk drive position error signal for demodulation.

BACKGROUND OF THE INVENTION

In direct access storage devices, such as disk drives, which employ embedded sector servo technology, burst fields are written to each servo field of a disk surface. Each burst field is written with a constant frequency signal. The burst fields are typically staggered so that the amplitude of burst field signal measured by a reading head over a servo field is useful for indicating any error in the positioning of the head over a track. A detected burst field signal is referred to herein as a Position Error Signal (PES). The pattern of PES amplitudes measured by a reading head passing over a servo field of a track, together with the pattern of burst field locations on the track, and on adjacent tracks, indicate the magnitude and direction of any error in the lateral position of the head.

Many modern disk drives use some form of digital signal processing to close a servo loop, in order to place a head at a specific location. The servo electronics of a disk drive are required to accurately read the amplitude, and possibly the phase, of the PES in order to supply the digital signal processor with digital values which are necessary to center the head above the desired track on a disk. The conversion of an analog PES to a digital PES value useful for determining the position error is referred to as PES demodulation.

One measure of performance for a disk drive is how close two data tracks can be placed together. This track density parameter is one of the most important parameters in determining the total data capacity of a disk. Some loss in track density results if the PES demodulator does not provide a sufficiently accurate digital PES value.

Another measure of performance for a disk drive is the head seek performance, which is a measure of the speed with which the drive can accurately place a head over a desired track, before reading from or writing to the track. Because faster head seek performance reduces the latency of the drive and increases the overall data throughput, high-performance disk drives typically have a faster head seek performance than lesser drives. High speed track seeking and following capability requires some form of predictive capability. Accurate prediction is achievable only if the digital PES value is accurate. Accurate PES demodulation is thus important for high-performance disk drives.

Analog synchronous PES demodulators are among the most accurate demodulators used today. An analog synchronous PES demodulator synchronously multiplies the PES with a reference clock square wave in a process known as "synchronous chopping", to obtain a rectified PES. The reference clock is generally derived from another burst field, known as the sync-field, which has the same frequency and phase as the PES burst fields. The rectified PES is then integrated over a fixed number of burst cycles. The integrated value corresponds to the magnitude of the PES.

Precision analog synchronous PES demodulators are difficult to implement, and often require large, complex circuitry. Integration of an analog synchronous PES demodulator into the main data channel of a disk drive is highly desirable, but is difficult to achieve due to the size and complexity of the circuitry. Current implementations of stand-alone analog synchronous demodulators are almost as large as the main data channel. Cost reduction is likely achievable through the use of a digital PES demodulator implementation.

In modern disk drives, the main data channel usually contains a 6 bit Analog-to-Digital Converter (ADC) for data detection. In some high-performance disk drives, digital PES resolution of more than 9 bits is necessary for adequate position error correction. A digital synchronous demodulator has been described for detecting phase-encoded servo signals. See U.S. Pat. No. 5,343,340 to Boutaghou et al. A thorough numerical modeling of such systems, however, reveals that even a 7 bit ADC would result in only slightly better than 7 bit digital PES resolution.

It would be desirable to provide a digital PES demodulator which takes advantage of the ADC present in the main data channel of a disk drive to provide a high resolution digital PES for position error correction.

SUMMARY OF THE INVENTION

The effective resolution of an integrated digital PES value is increased by synchronously dithering the analog PES before sampling by the read channel ADC. For each burst cycle of an integration window, a DC dithering offset is added to the analog PES before sampling. The dithering offset is changed periodically, during the integration window. The dithering offsets are evenly spaced over a range which is equal to the product of the size of the least significant bit of the ADC multiplied by a positive integer, resulting in enhanced resolution of the digital PES.

DETAILED DESCRIPTION OF THE PREFERRED EMBODIMENTS

Figure 1:
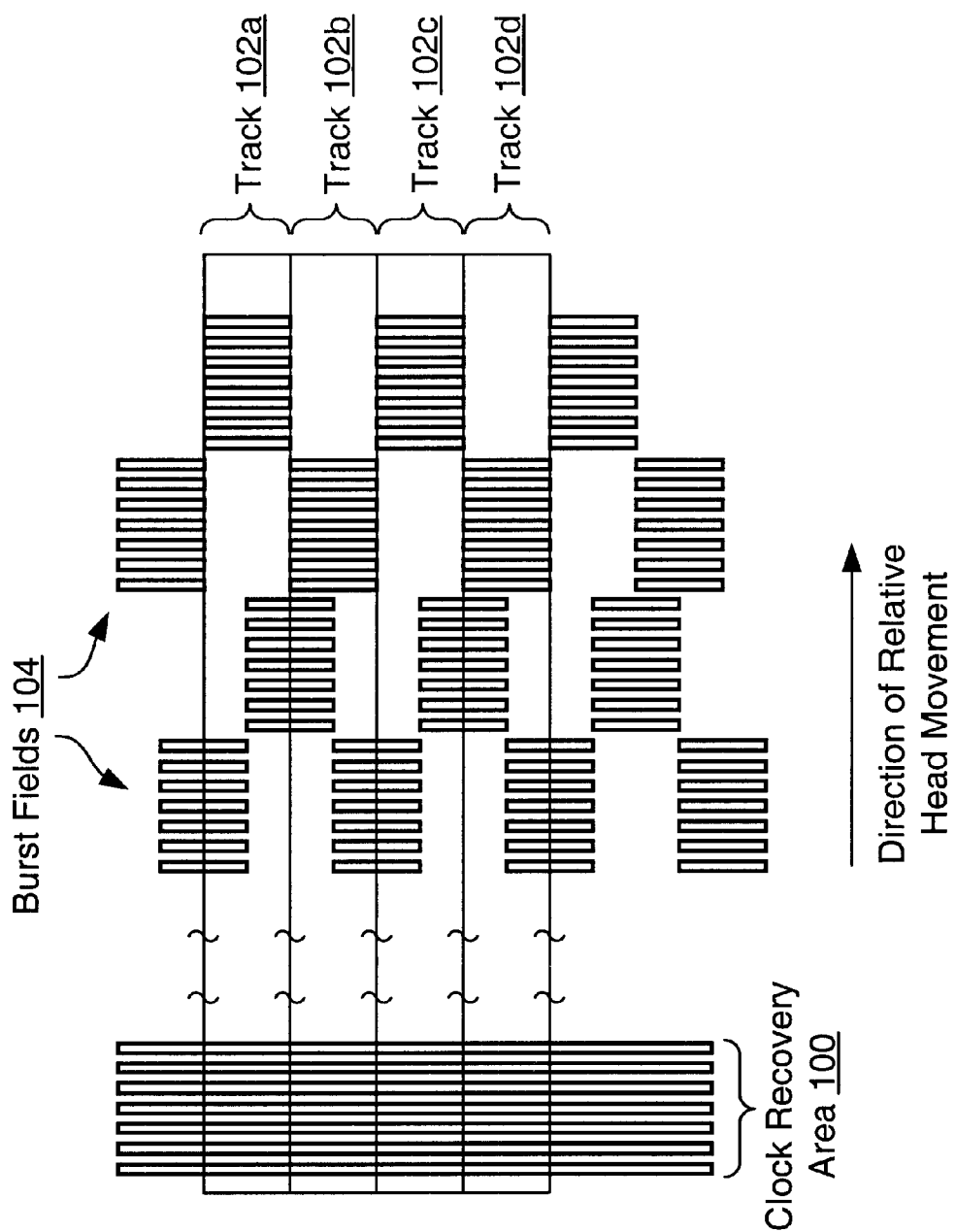
FIG. 1 is an illustration of sync-field 100 and burst fields 104 in a servo sector on a data storage disk.

Referring now to FIG. 1, a servo sector pattern on a data storage disk is illustrated. Sync-field 100 includes a constant-frequency analog sinusoidal clock recovery signal which extends across all tracks 102. Because sync-field 100 extends across all tracks 102, a head traversing sync-field 100 will detect the same clock recovery signal regardless of whether the head is centered over a particular track 102. A head which is seeking a particular track 102 will move to the approximate location of that track 102, before traversing the sync-field 100. While traversing the sync-field 100, the clock recovery signal will be detected. This signal is used to calibrate an internal clock to match the frequency and phase of the signal recorded on the sync-field 100. The particular clock recovery technique among conventional techniques that is utilized for recovering clock information from servo sectors of data storage disks is not important to the present invention.

A head which is centered over track 102a in FIG. 1, after traversing sync-field 100, will pass over two areas which are each half-covered by burst fields 104, then over one area containing no burst field 104, and finally over one area that is completely covered by a burst field 104. Each burst field 104 includes an analog sinusoidal signal with the same frequency and phase as the clock recovery signal. The relative amplitudes of burst field signals detected by a head centered over track 102a will be: ½, ½, 0, and 1. If the head is slightly off-center, for example, in the direction of track 102b, the relative amplitudes of the burst signals detected will be different. In that case, the first detected burst field signal amplitude would be less than ½, the second detected burst field signal amplitude would be more than ½, the third detected burst field signal amplitude would be more then 0, and the last detected burst field signal amplitude would be less than 1. The pattern of amplitudes detected by a head traversing burst fields 104 can be used by a Digital Signal Processor (DSP) to accurately determine the magnitude and direction of any such error in the position of the head. These detected burst field signals are referred to as Position Error Signals (PES). In order to quickly and accurately compensate for position errors, the servo electronics must have an accurate measure of the position error. In order to accurately determine the position error from the measured burst field signal amplitudes, the amplitudes must be measured accurately.

Figure 2:
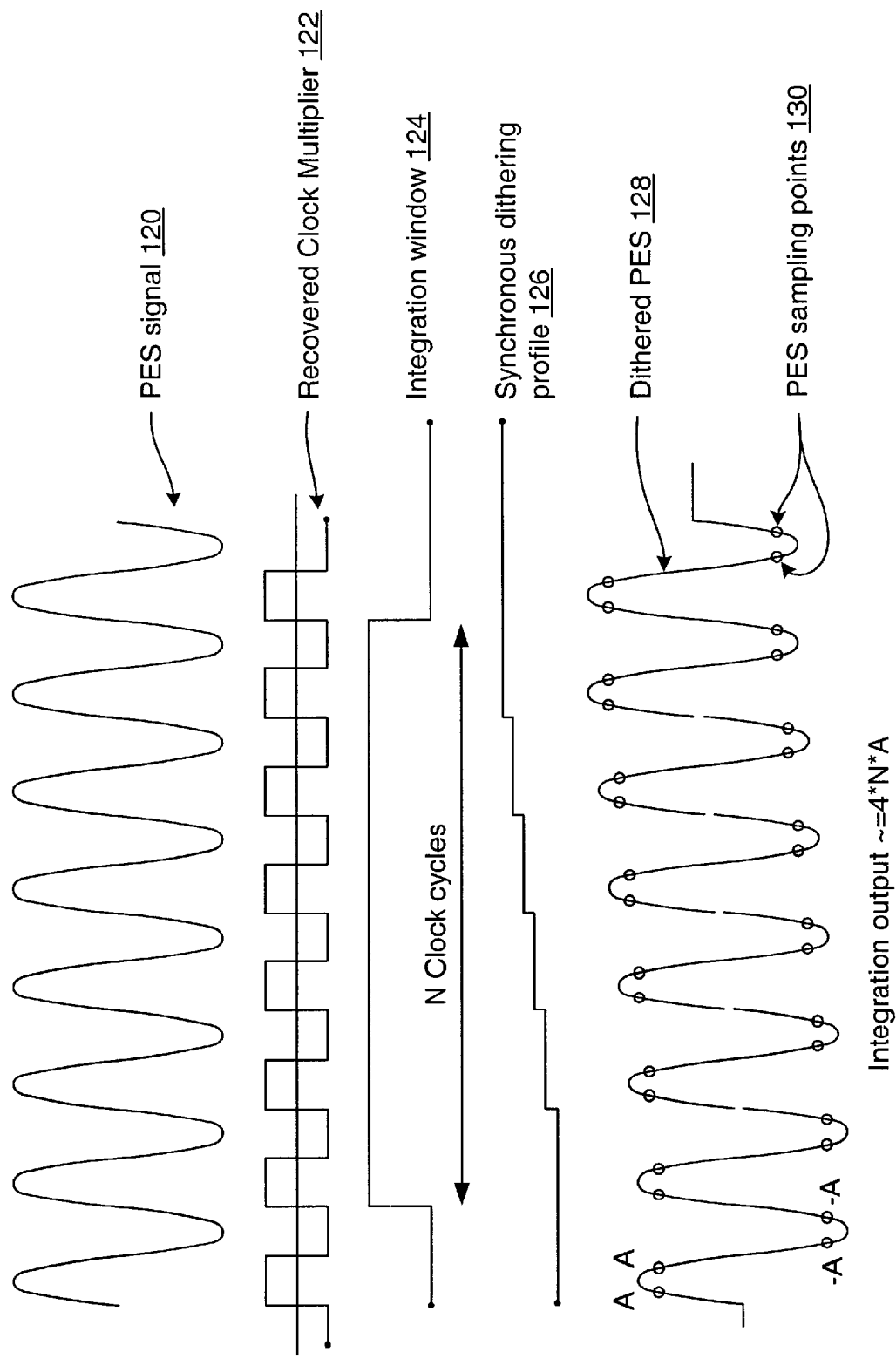
FIG. 2 is an illustration of signals used in determining digital PES value 160.

FIG. 2 illustrates a typical analog PES 120 detected by a head passing over a burst field 104 of recorded signals. Recovered clock information is used to produce clock multiplier 122, which is a square wave signal with a value of +1 while PES 120 is in the top half of its range, and a value of −1 while PES 120 is in the bottom half of its range. Multiplying PES 120 by clock multiplier 122 results in a synchronously-chopped signal which is suitable for direct numerical integration.

Numerical integration of the synchronously-chopped signal occurs over a period of N cycles of PES 120, where N is some positive integer. In the embodiment described, N is eight. The duration of the N cycles defines integration window 124. Dithering profile 126 includes discrete values for each of the N cycles of integration window 124.

Figure 3:
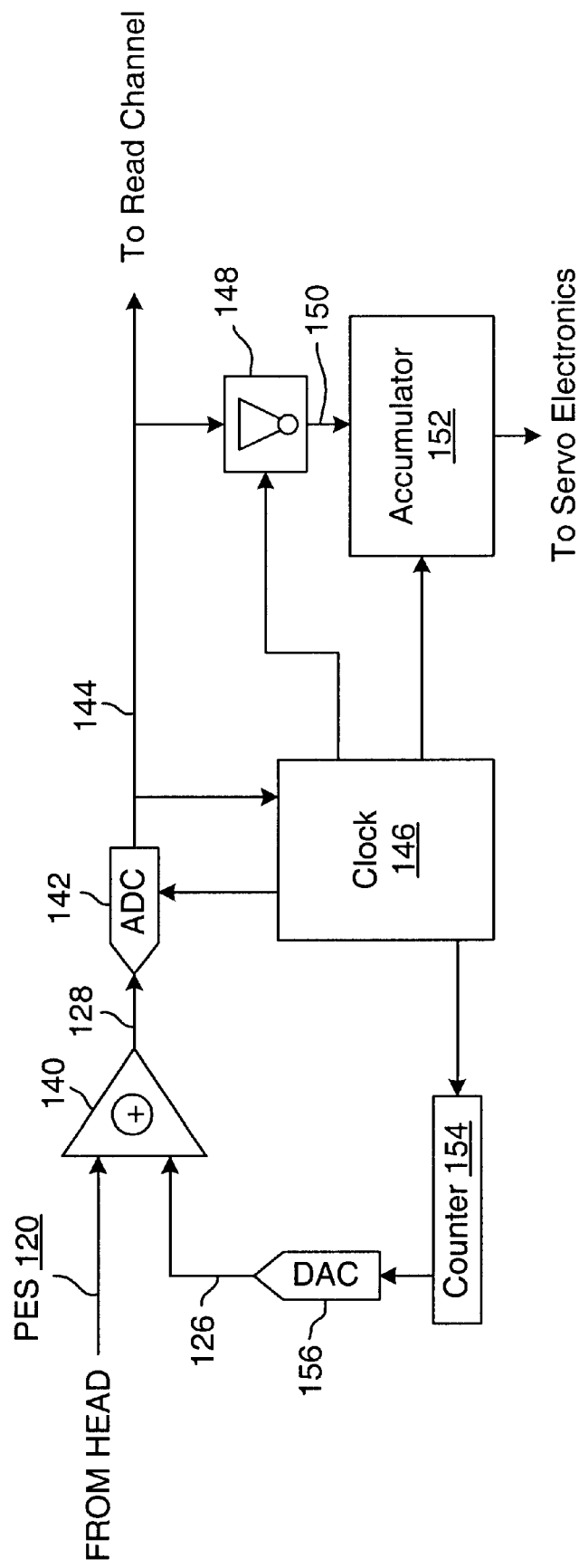
FIG. 3 is a schematic illustration of one embodiment of the invention.

FIG. 3 is a schematic illustration of one implementation of the invention. PES 120 is received from the head (not shown) while the head is traversing burst fields 104. Analog adder 140 adds PES 120 and dithering profile 126 to generate dithered PES 128. Analog-to-Digital Converter (ADC) 142, which has a resolution of six bits in the embodiment described, accepts dithered PES 128. At sampling points 130 (shown in FIG. 2), ADC 142 samples dithered PES 128, producing six bit sample values 144.

During the first cycle of integration window 124, dithering profile 126 is zero. During the second cycle, dithering profile 126 is 1/N of the value of the Least Significant Bit (LSB) of ADC 142. After each cycle, dithering profile 126 is increased by 1/N of the value of LSB. During the final cycle of integration window 124, dithering profile 126 has a value which is LSB*(N−1)/N.

The timings of clock multiplier 122, integration window 124, sampling points 130, and dithering profile 126 are carried out by clock module 146. Clock module 146 recovers the frequency and phase of PES 120 when the head traverses sync-field 100. During the traversal of sync-field 100, dithering profile 126 is held to zero, and ADC 142 samples the clock recovery signal detected by the head. After having recovered the frequency and phase of PES 120, clock module 146 uses this information for all timing which is based upon the cycles of PES 120.

There are four sampling points 130 per cycle during integration window 124, with the first sampling point 130 following the start of the cycle by 45°. Subsequent sampling points 130 are at 135°, 225° and 315°. The measurements within each cycle are based on a sine wave, with 0° being at the positive-slope zero crossing. The first two sample values 144 of each cycle should be the product of the amplitude of PES 120 multiplied by 0.7071. The second two sample values 144 should be the product of the amplitude of PES 120 multiplied by −0.7071. By multiplying sample values 144 by clock multiplier 122, all four samples are rectified to positive values. Negation module 148 accepts sample values 144, and clock multiplier 122. When clock multiplier 122 is +1, sample value 144 is passed through unchanged as rectified value 150. When clock multiplier 122 is −1, rectified value 150 is the negative of sample value 144. Clock multiplier 122 toggles negation module 148 twice per cycle, negating sample values 144 when they are expected to be negative, and passing the sample values 144 unchanged when they are expected to be positive. Rectified sample values 150 are passed on to accumulator 152. Accumulator 152 is cleared by clock module 146 before each integration window 124, and sums each rectified sample value 150. Following integration window 124, the value held in accumulator 152 is digital PES value 160, which is passed to the DSP for use in the estimation and correction of head position error. PES value 160 is approximately equal to the product of the amplitude of PES 120 multiplied by 0.7071*4*N.

Dithering profile 126 is implemented through three-bit counter 154 and Digital-to-Analog Converter (DAC) 156. After each cycle of integration window 124, clock module 146 increases counter 154 by one. Three-bit counter 154 has a range of eight values, from zero through seven. The value stored in counter 154 is input to DAC 156, which is scaled to produce a zero signal in response to an input of zero, and a signal corresponding to ⅞ of the value of LSB in response to an input of seven. After the last cycle of integration window 124, when counter 154 contains the value seven, counter 154 is reset to zero in response to the next increment signal from clock module 146.

The effect of dithering PES 120 over the range of one LSB is to increase the effective resolution of PES value 160. Without dithering, PES value 160 would be N multiplied by the sum of sample values 144 for one cycle. For example, if the size of LSB is assumed to be one, and PES 120 is assumed to be ±10.4 at sample points 130, then without dithering, the accumulation over 8 cycles would be 336, as indicated in Table 1:

TABLE 1

|  | Cycle | | | | | | | | |
| --- | --- | --- | --- | --- | --- | --- | --- | --- | --- |
|  | 1 | 2 | 3 | 4 | 5 | 6 | 7 | 8 | |
| Sample 1 | 10 | 10 | 10 | 10 | 10 | 10 | 10 | 10 | |
| Sample 2 | 10 | 10 | 10 | 10 | 10 | 10 | 10 | 10 | |
| Sample 3 | −11 | −11 | −11 | −11 | −11 | −11 | −11 | −11 | |
| Sample 4 | −11 | −11 | −11 | −11 | −11 | −11 | −11 | −11 | |
| Totals of Rectified Samples | 42 | 42 | 42 | 42 | 42 | 42 | 42 | 42 | 336 |

The sample values 144 in Table 1 assume that digital samples are rounded down to the next lowest LSB, which in this case is 1.0. If PES 120 were ±9.9 at sample points 130, then without dithering the accumulation over 8 cycles would be 304, as shown in Table 2:

TABLE 2

|  | Cycle | | | | | | | | |
| --- | --- | --- | --- | --- | --- | --- | --- | --- | --- |
|  | 1 | 2 | 3 | 4 | 5 | 6 | 7 | 8 | |
| Sample 1 | 9 | 9 | 9 | 9 | 9 | 9 | 9 | 9 | |
| Sample 2 | 9 | 9 | 9 | 9 | 9 | 9 | 9 | 9 | |
| Sample 3 | −10 | −10 | −10 | −10 | −10 | −10 | −10 | −10 | |
| Sample 4 | −10 | −10 | −10 | −10 | −10 | −10 | −10 | −10 | |
| Totals of Rectified Samples | 38 | 38 | 38 | 38 | 38 | 38 | 38 | 38 | 304 |

In order to find the measured PES value, each of these accumulated values is divided by 32, or 4*N. This yields a measured PES value of 10.5 for the first case, and 9.5 for the second case. The resolution is one LSB, which is the same as if only a single cycle had been sampled.

When dithering is employed over eight cycles, the result is a higher resolution in the final measured PES value 160.

If dithering had been used in the examples above, sample values 144 would have had a variety of values over the eight cycles of integration window 124, as indicated in Table 3, corresponding to PES 120 of ±10.4, and Table 4, corresponding to PES 120 of ±9.9:

TABLE 3

|  | Cycle | | | | | | | | |
| --- | --- | --- | --- | --- | --- | --- | --- | --- | --- |
|  | 1 | 2 | 3 | 4 | 5 | 6 | 7 | 8 | |
| Sample 1 | 10 | 10 | 10 | 10 | 10 | 11 | 11 | 11 | |
| Sample 2 | 10 | 10 | 10 | 10 | 10 | 11 | 11 | 11 | |
| Sample 3 | −11 | −11 | −11 | −11 | −10 | −10 | −10 | −10 | |
| Sample 4 | −11 | −11 | −11 | −11 | −10 | −10 | −10 | −10 | |
| Totals of Rectified Samples | 42 | 42 | 42 | 42 | 40 | 42 | 42 | 42 | 334 |

TABLE 4

|  | Cycle | | | | | | | | |
| --- | --- | --- | --- | --- | --- | --- | --- | --- | --- |
|  | 1 | 2 | 3 | 4 | 5 | 6 | 7 | 8 | |
| Sample 1 | 9 | 10 | 10 | 10 | 10 | 10 | 10 | 10 | |
| Sample 2 | 9 | 10 | 10 | 10 | 10 | 10 | 10 | 10 | |
| Sample 3 | −10 | −10 | −10 | −10 | −10 | −10 | −10 | −10 | |
| Sample 4 | −10 | −10 | −10 | −10 | −10 | −10 | −10 | −10 | |
| Totals of Rectified Samples | 38 | 40 | 40 | 40 | 40 | 40 | 40 | 40 | 318 |

For the case where PES 120 is ±10.4 at sampling points 130, the accumulation over eight cycles is 334, and for the case where PES 120 is ±9.9 at sampling points 130, the accumulation over eight cycles is 318. The measured value for the first case, (after dividing by 32) would be 10.4375, and the measured value for the second case would be 9.9375. These numbers are much more accurate, and reflect a higher resolution compared to the case without dithering. The increase in resolution is dependent upon the number of dithering steps used to cover the range of one LSB.

Figure 4:
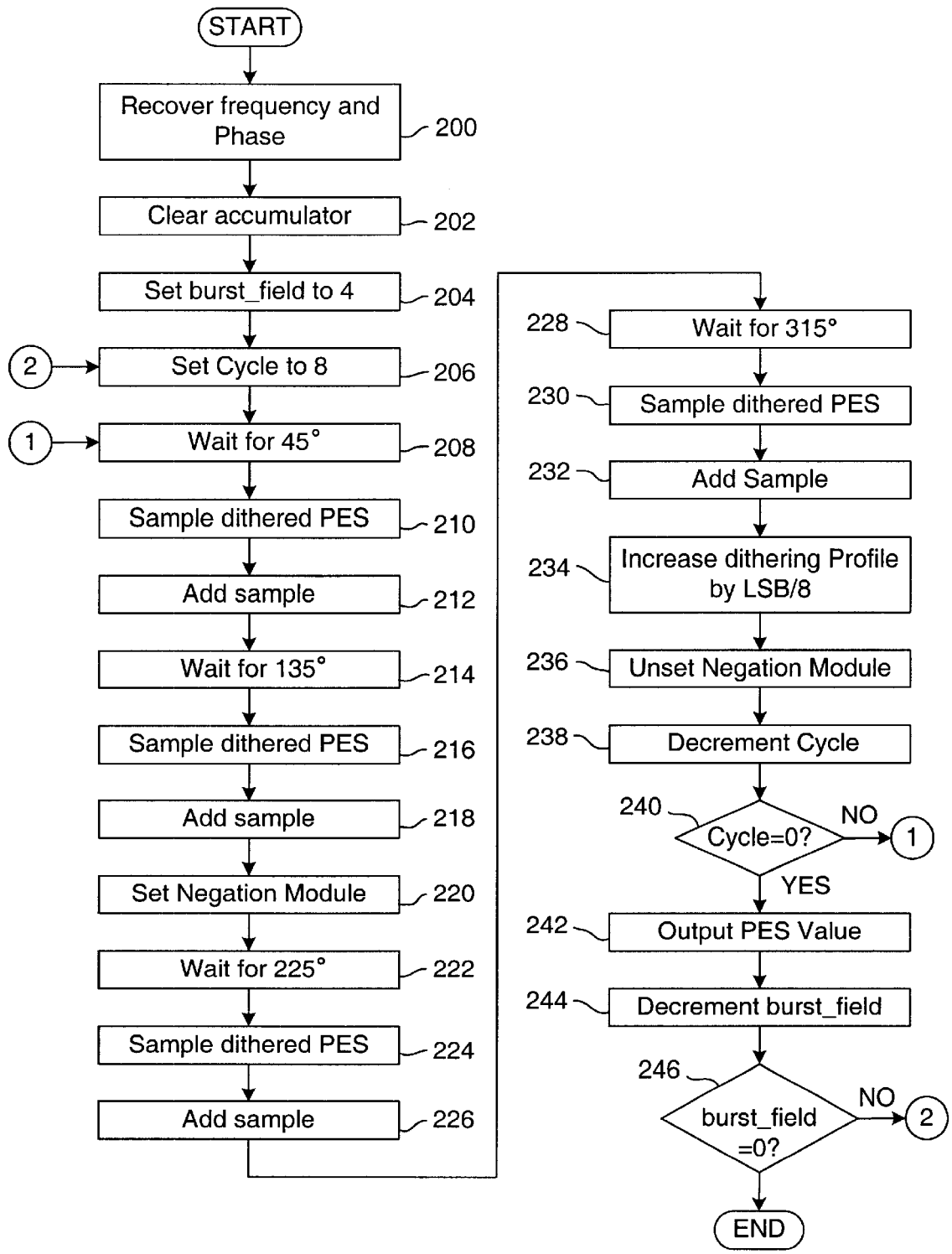
FIG. 4 is a flowchart illustrating the operation of one embodiment of the invention.

The operation of one embodiment of the invention is described with reference to the flowchart of FIG. 4. First, frequency and phase information is recovered 200 while the head is traversing sync-field 100. While the head is traversing sync-field 100, no increment signals are sent by clock module 146 to counter 154, so dithering profile 126, which is initially zero, does not increase during the traversal.

Next, a counter burst_field is initialized 202 to the value four, which is the number of burst fields 104 per servo sector. Following that, accumulator 152 is cleared 204 and a counter PEScycle is initialized 206 to the value eight, which is the number of cycles per integration window 124.

Clock module 146 then waits 208 for the next 45° point of a cycle. At that point, clock module 146 signals ADC 142 to sample 210 dithered PES 128 from analog adder 140. Sampled value 144 is passed to digital negation module 148. During the first half of the cycle (less than 180°), clock multiplier 122 is set to +1 so that rectified sample value 150 is the same as sampled value 144. Accumulator 152 adds 212 rectified sample value 150 to the current accumulator value, which is zero. Next, clock module 146 waits 214 for the 135° point of the cycle, then signals ADC 142 to sample 216 dithered PES 128. Rectified sample value 150 is again the same as sampled value 144. Accumulator 152 adds 218 rectified sample value 150 to the current accumulator value.

For the second half of the cycle, clock multiplier 122 signals 220 negation module 148 to make rectified sample value 150 the negative of sampled value 144. Clock module 146 then waits 222 for the 225° point of the cycle, before signaling ADC 142 to sample 224 dithered PES 128. Negation module 148 negates sampled value 144, which should be negative, into rectified sample value 150, which should be positive. Accumulator 152 adds 226 rectified sample value 150 to the current accumulator value. Then, clock module 146 waits 228 for the 315° point of the cycle, at which point it signals ADC 142 to sample 230 dithered PES 128. Negation module 148 negates sampled value 144 into rectified sample value 150, which is added 232 by accumulator 152 to the current accumulator value.

Next, clock module 146 signals counter 154 to increase, causing DAC 156 to increase 234 dithering profile 126 by LSB/8. Negation module 148 is then signaled 236 by clock multiplier 122 to stop negating. PEScycle is decremented 238 by one, and a test 240 is performed to determine whether PEScycle is zero. If it is not, there is at least one more cycle to integrate, and clock module 146 again waits 208 for the 45° point of the next cycle, continuing the process as described above. If PEScycle is zero, the accumulator value is output 242 to the DSP as PES value 160. Then the burst_field counter is decremented 244 by one. A test 246 is performed to determine whether burst_field is zero. If it is not, PES value 160 is cleared 204, and execution continues from that point as described above. If burst_field is zero, then the final PES value 160 has been passed to the DSP, and the process comes to an end. The next time the head traverses sync-field 100, the clock module 146 recovers 200 the frequency and phase, and the process begins again.

The above description illustrates the operation of exemplary embodiments. Many variations can be incorporated into the invention including, for example, that N can be any positive integer larger than one. Dithering profile 126 does not need to change exactly once for each cycle in integration window 124, as dithering profile 126 could change values either more often than once per cycle, or less often than once per cycle. For example, where there are an even number of sample points in each cycle, as described, the dithering profile can change as often as every half-cycle. Also, the scheme by which dithering profile 126 varies does not require stepping in the fashion described, since dithering profile 126 can vary continuously during the integration window 124 to achieve the same effect. The range over which dithering profile 126 varies does not have to be exactly one LSB. Dithering profile 126 can vary over a range of more than one LSB, although the range should be an integer number of LSBs. The number of burst fields 104 per servo sector can be more or less than four.

What is claimed is:

1. A method for determining an amplitude from a periodic analog input signal in a PES demodulator, the method comprising:
    (a) generating an integration window signal having a predetermined time period;
    (b) generating a sampling point signal;
    (c) generating a dither timing signal
    (d) generating a dither signal of a selected profile in accordance with the dither timing signal, said dither signal comprising a DC dithering offset signal;
    (e) summing the dither signal with an input signal to output a dithered analog signal;
    (f) producing digital samples by periodically sampling the dithered analog signal in accordance with the sampling point signal; and
    (g) summing the digital samples during the predetermined time period, wherein the summation is reset at a beginning of or prior to integration window signal.

2. The method of claim 1 in a direct access storage device including burst fields, wherein the input signal is a position error signal generated by detection of one of the burst fields.

3. The method of claim 1, wherein the dithering signal of selected profile is substantially constant over each of a plurality of time segments.

4. The method of claim 3, wherein each time segment corresponds to a period of time which is an integer number of half-cycles of the input signal.

5. The method of claim 4, wherein each time segment corresponds to a period of time which is one cycle of the input signal.

6. The method of claim 3, wherein the dithering signal of selected profile has different dithering values for at least two of the time segments.

7. The method of claim 6, wherein the dithering signal of selected profile has a different dithering value for each time segment.

8. The method of claim 1, wherein the dithering signal of selected profile includes a substantially even distribution of dithering values over a range which is proportional to the value of the least significant bit of the digital samples.

9. The method of claim 8, wherein the size of the dithering range is substantially equal to the value of the least significant bit of the digital samples.

10. The method of claim 8, wherein the dithering values increase monotonically with time during a portion of the N cycles of the periodic analog input signal.

11. The method of claim 8, wherein the dithering values decrease monotonically with time during a portion of the N cycles of the periodic analog input signal.

12. The method of claim 8, wherein the dithering values increase monotonically with time during one half of the N cycles of the periodic analog input signal, and decrease monotonically with time during another half of the N cycles of the periodic analog input signal.

13. The method of claim 1, wherein the step of periodically sampling the dithered analog signal occurs at least once for each of the N cycles of the periodic analog input signal.

14. The method of claim 1, wherein the step of periodically sampling the dithered analog signal occurs at least four times for each of the N cycles of the periodic analog input signal.

15. The method of claim 1, wherein the dithered analog signal is sampled at times corresponding to approximately 45°, 135°, 225° and 315° angular offsets from a positive-slope zero crossing of each of the N cycles of the periodic analog input signal.

16. A method according to claim 1, wherein step (f) is performed at sampling intervals substantially symmetrically oriented in each period of the dithered analog signal.

17. A method according to claim 1, further comprising the step of rectifying the digital samples step (f) for summation in step (g).

18. A method according to claim 1, further comprising the steps of:

generating a multiplier signal; and multiplying the digital samples are multiplied by the multiplier signal for summation in step (g).

19. A method according to claim 1, wherein the predetermined time period comprises N portions, wherein the dithering profile signal is increased for increasing ones of the N portions for each predetermined time period.

20. A PES demodulator, comprising:

a clock module to generate an integration window signal, a sampling point signal and a dither timing signal, wherein the integration window signal has a predetermined time period;

a dither signal generator to generate a dithering profile signal in accordance with the dither timing signal, said dither signal comprising a DC dithering offset signal;

an analog adder to add an analog input signal to the dithering profile signal to output a dithered analog signal;

an Analog-to-Digital Converter (ADC) to convert the dithered analog signal to a plurality of digital samples in accordance with the sampling point signal; and an accumulator coupled to the circuit module for accumulating the digital samples during the predetermined time period, wherein the accumulator is reset at a beginning of or prior to integration window signal.

21. The PES demodulator of claim 20, wherein the analog input signal is a position error signal generated by detection of a burst field signal of a direct access storage device.

22. The PES demodulator of claim 20, wherein the clock module transfers the dithering profile signal of substantially constant value over each of a plurality of time segments.

23. The PES demodulator of claim 22, wherein each time segment corresponds to a period of time which is substantially equal to an integer number of half-cycles of the periodic analog input signal.

24. The PES demodulator of claim 22, wherein the dithering profile signal has different dithering values for at least two of the time segments.

25. The PES demodulator of claim 20, wherein the dithering profile signal has a substantially even distribution of dithering values over a dithering range which is proportional to the value of the least significant bit of the digital samples produced by the circuit module.

26. A PES demodulator according to claim 20, wherein said ADC convert the dithered analog signal to the plurality of digital samples at sampling intervals substantially symmetrically oriented in each period of the dithered analog signal.

27. A PES demodulator according to claim 20, further comprising a rectifier circuit to rectify the digital samples for summation by said accumulator.

28. A PES demodulator according to claim 20, further comprising a negation circuit, wherein said clock module further provides a multiplier signal, wherein the digital samples are multiplied by the multiplier signal for summation by said accumulator.

29. A PES demodulator according to claim 20, wherein the predetermined time period comprises N portions, wherein the dithering profile signal is increased for increasing ones of the N portions for each predetermined time period.

* * * * *